3,159,665
O-ALKYLMERCAPTOALKYL AND O-ARYLMERCAPTOALKYL O-ALKYL PHOSPHORAMIDOTHIOATES

Etcyl H. Blair, Midland, Mich., assignor to The Dow Chemical Company, Midland, Mich., a corporation of Delaware
No Drawing. Filed Dec. 5, 1960, Ser. No. 73,510
6 Claims. (Cl. 260—461)

This invention is directed to the O-(alkylthio)alkyl-O-lower alkyl phosphoramidothioates corresponding to the formula

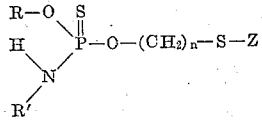

In this and succeeding formulae, R represents lower alkyl, R' represents hydrogen or R, $n$ represents an integer from 2 to 4, inclusive, Z represents an alkyl, cycloalkyl, or aryl hydrocarbon radical containing up to 8 carbon atoms. The expression lower alkyl is employed in the present specification and claims to refer to an alkyl radical containing from 1 to 5, inclusive, carbon atoms. The new compounds are viscous liquids which are somewhat soluble in many organic solvents and of very low solubility in water. They have been found to be useful as parasiticides and herbicides and are adapted to be employed as active toxic constituents of compositions for the control of various plants, mites, insects, nematodes and bacterial and fungal organisms. Representative insect organisms and the like which the present compounds kill are acarine mites, scarabeid beetles, lepidopterous larvae and adults, aphids: house flies, and grain-infesting insects, notably coleopterous and lepidopterous insects. The compounds are also useful as preservatives for paper, paint and wood, and as germicides for the control of bacteria and fungi.

It is to be noted that the present compounds, considered in respect to the nitrogen atom, are all secondary amides. The presence of the hydrogen atom attached to the nitrogen atom confers remarkable biological activity upon the present compounds, not possessed by compounds which are generally similar but which lack this essential and critical characteristic.

The new compounds may be prepared by several methods. In one method of preparation, an alkali metal salt of an (alkylthio)alkanol corresponding to the formula $$M-O-(CH_2)_n-S-Z$$

wherein M represents an alkali metal is reacted with an O-lower alkyl phosphoramidochloridothioate of the formula

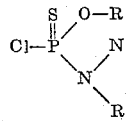

The reaction preferably is carried out in an inert organic solvent as reaction medium such as acetone, benzene, xylene, lower alkanols and methyl ethyl ketone. Good results are obtained when employing substantially equimolecular proportions of the reactants. The reaction is moderately exothermic and takes place smoothly at the temperature range of from 0° to 120° C. with the production of the desired product and alkali metal chloride of reaction.

In carrying out the reaction, the reactants conveniently are mixed together in the reaction medium and the resulting mixture maintained for a period of time within the contacting temperature range. External cooling may be used, if desired. Upon completion of the reaction, the reaction mixture may be washed with water and, if desired, with a mild alkali such as 5 percent aqueous sodium carbonate, the reaction medium removed by fractional distillation under reduced pressure to obtain the desired product as a residue.

The following examples merely illustrate the invention and are not to be construed as limiting.

EXAMPLE 1

*O-(2-Ethylthio)Ethyl O-Methyl Methylphosphoramidothioate*

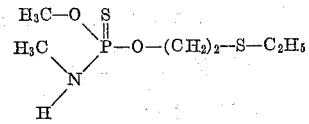

Sodium metal (0.25 mole, 5.75 grams) in 100 milliters of xylene was heated to 130° C. with rapid stirring. The system was quickly cooled to form a dispersion in xylene. 2-(ethylthio)ethanol (0.25 mole, 26.5 grams) was added. The mixture was heated to 50–60° C. for two hours by which time all the sodium had reacted with the alcohol. Forty grams (0.25 mole) of O-methyl methylphosphoramidochloridothioate was added to xylene solution at 20–30° C. The temperature increased rapidly to 35° C. but was limited at about that level with an ice bath. The addition was complete in 15 minutes. The resulting mixture was then heated to 50° C. and allowed to cool to room temperature. The color of the reaction mixture turned dark brown as soon as the acid chloride was added. Sodium chloride precipitated immediately.

The reaction mixture, after standing overnight, was dark red in color. It was washed with 150 milliliters of water, then with 100 milliliters of 5 percent aqueous sodium carbonate. The original water wash was then extracted with 50 milliliters of benzene. The resulting benzene and xylene solutions were combined and washed 4 times with water. After drying over anhydrous calcium sulfate the solvents were removed by vacuum distillation.

A 70 percent yield of O-(2-ethylthio)ethyl O-methyl methylphosphoramidothioate was obtained.

The product was a red liquid which was analyzed and found to contain 6.42 percent nitrogen and 26.15 percent sulfur as compared with theoretical values of 6.10 and 27.90 percent, respectively. The product had a refractive index $n/D$ of 1.5250 at 25° C.

EXAMPLE 2

*O-2-(Methylthio)Ethyl O-Propyl Methylphosphoramidothioate*

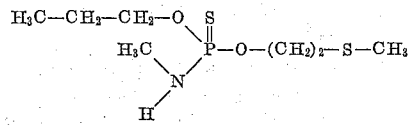

An excess of 2-(methylthio)ethanol (30 grams, 0.326 mole) was dropped, with rapid stirring, into a toluene solution containing sodium shot which had been made by rapidly stirring 6 grams (0.26 mole) of sodium metal in 200 milliliters of toluene heated at reflux until the sodium melted, and then chilling rapidly. There was thus prepared a dispersion, in the toluene, of sodium 2-(methylthio)ethoxide, corresponding to the formula

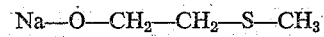

This dispersion was cooled to 30° C., and 47 grams (0.25 mole) of O-propyl methylphosphoramidochloridothioate was added over a period of 30 minutes. The reaction was strongly exothermic and was kept below 45°

C. by cooling with an ice bath. The mixture was stirred at room temperature for 2 hours following the addition. Then 300 milliliters of benzene was added, and the mixture was washed three times with 300 milliliter portions of water to remove sodium chloride and excess 2-(methylthio)ethanol. The aqueous washes were extracted with 200 milliliters of methylene chloride. The methylene chloride solution and the benzene-toluene solutions were combined and dried over anhydrous calcium sulfate. The drying agent was later filtered off and the solvents distilled off under reduced pressure to give 53 grams of a dark red liquid O-2-(methylthio)ethyl O-propyl methylphosphoramidothioate product in a yield which was 87.2 percent of theoretical.

The product was found to have an index of refraction n/D of 1.5068 at 25° C., and to have contents of nitrogen and sulfur of 5.06 and 25.47 percent respectively, as compared with theoretical values of 5.75 and 26.35 percent respectively.

EXAMPLE 3

O-2-(Ethylthio)Ethyl O-Methyl Sec-Butylphosphoramidothioate

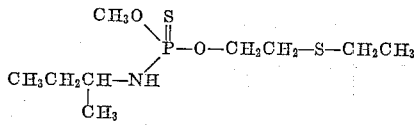

The sodium salt of 2-(ethylthio)ethanol (0.25 mole) in 250 milliliters of toluene (prepared as described in Examples 1 and 2) was allowed to drop slowly over one hour into a stirred solution (0.25 mole) of O-methyl sec-butylphosphoramidochloridothioate. The reaction which occurred upon combining of the said reactants was strongly exothermic. Temperature of the resulting reaction mixture was maintained in the range of 40°–45° C.

After the addition was complete the mixture was heated to 60° C., and then cooled to room temperature. The mixture was washed with water, with 5 percent aqueous sodium carbonate, then three times with water. The toluene solution containing the desired product was filtered and the solvent distilled off under reduced pressure to give 40 grams of a red colored liquid, O-2-(ethylthio)ethyl O-methyl sec-butylphosphoramidothioate product. Yield was 59 percent of theory.

The resulting product had refractive index n/D of 1.5020 at 25° C., and was found, upon analysis, to have contents of nitrogen and sulfur of 6.38 and 21.48 percent, as compared with 5.16 and 23.58 percent, respectively.

EXAMPLE 4

O-2-(Octylthio)Ethyl O-Methyl Ethylphosphoramidothioate

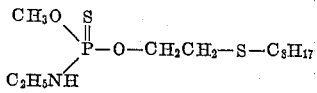

2-(octylthio)ethanol, 47 grams, dissolved in 50 milliliters of toluene was added to a stirred suspension of sodium metal (6 grams) in toluene. The resulting reaction mixture was heated at 90–100° for 12 hours to complete the reaction. The resulting sodium salt was added, with stirring and cooling, over 2 hours, to a toluene solution containing 0.237 mole (41.0 grams) of O-methyl ethylphosphoramidochloridothioate. The temperature was maintained at 40° during the addition, and then heated to 50° for one hour, to carry the reaction to completion.

After standing, covered, for approximately 65 hours, (over a week-end) the product was washed with 250 milliliters of water, then with 250 milliliters aqueous 5 percent sodium carbonate, and finally two times with 250 milliliters of water. The organic phase was dried over anhydrous sodium sulfate. The drying agent was filtered off and the solvent removed under reduced pressure to give 62 grams of O-2-(octylthio)ethyl O-methyl ethylphosphoramidothioate product as a dark red liquid.

The product had a refractive index n/D of 1.0326 at 25° C., and was found, upon analysis, to have contents of nitrogen and sulfur of 3.95 and 19.49 percent, respectively, as compared with theoretical values of 4.29 and 19.61 percent, respectively.

EXAMPLE 5

O-2-(Phenylthio)Ethyl O-Propyl Methylphosphoramidothioate

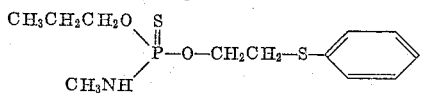

7.5 grams of 50 percent sodium dispersion in toluene was placed in 200 milliliters of toluene and to this was added 0.16 mole (24 grams) of 2-(phenylthio)ethanol. The temperature of the reaction increased spontaneously to 45° and was maintained at about 45° during the addition of the 2-(phenylthio)ethanol, which required one hour. The resulting reaction mixture was stirred for 6 additional hours and then allowed to stand overnight, to prepare a dispersion of sodium 2-(phenylthio)ethoxide.

Over a period of 30 minutes, 31 grams (0.166 mole) of O-propyl methylphosphoramidochloridothioate was added to the ethoxide dispersion which has been diluted further with benzene. This reaction was strongly exothermic and the temperature was maintained at 40° C. for one hour after completion of the combining of the reactants. The system was then stirred for two hours as it cooled spontaneously, and then washed three times with successive 300 milliliter portions of water. From the resulting washed product solvent was distilled off under reduced pressure to give 47 grams of a dark red O-2-(phenylthio)ethyl O-propyl methylphosphoramidothioate product, having a refractive index n/D of 1.5521 at 25° C. The yield was 98 percent of theoretical.

EXAMPLE 6

O-2-(Cyclohexylthio)Ethyl O-(2,2-Dimethylpropyl) Methylphosphoramidothioate

In procedures similar to those employed in the foregoing examples, potassium is heated in mesitylene to approximately 100° C., with rapid stirring and the resulting dispersion is thereafter quickly chilled to obtain a fine dispersion of the metal in the hydrocarbon. To the resulting dispersion, 2-(cyclohexylthio)ethanol is added, with stirring, and the resulting mixture is then heated for approximately two hours at 40°–50° C. to carry to completion the reaction and prepare potassium 2-(cyclohexylthio)ethoxide in solution in mesitylene.

To this solution is then added O-(2,2-dimethylpropyl) methylphosphoramidochloridothioate slowly at room temperature, and with stirring. An exothermic reaction takes place as the resulting reaction mixture darkens and potassium chloride precipitates. Addition of the phosphoramidochloridothioate is carried out so slowly that the temperature of the resulting reaction does not rise above about 30° C.

Upon completion of the addition, the resulting mixture is heated promptly to about 50° C. and thereafter cooled, and allowed to stand for approximately 18 hours, at room temperature. In this condition the resulting mixture is a solution in mesitylene of the desired O-2-(cyclohexylthio)ethyl O-(2,2-dimethylpropyl) methylphosphoramidothioate. The solution is washed with water, with dilute aqueous sodium carbonate, and with repeated further portions of water, dried over anhydrous calcium sulfate, and fractionally distilled under sub-atmospheric pressure to remove solvent and obtain the O-2-(cyclohexylthio)ethyl O-(2,2-dimethylpropyl) methylphosphoramidothioate as a dark red liquid, having a molecular weight of 339.5.

EXAMPLE 7

In procedure similar to the foregoing employing benzene as dispersant, potassium as alkali metal, and 4-(2,4-dimethylphenylthio)butanol, there is prepared a potassium 4-(2,4-dimethylphenylthio)butoxide which is reacted, in methyl ethyl ketone, with O-methyl n-pentylphosphoramidochloridothioate to obtain an O-4-(2,4-dimethylphenylthio) butyl O-methyl n-pentlyphosphoramidothioate.

The new compounds of the present invention have been found to be useful as herbicides and parasiticides for the control of various arachnids, insects, nematodes, and bacterial and fungal organisms. For such use, the products may be dispersed on a finely divided solid and employed as dusts. Also, such mixtures may be dispersed in water with the aid of a wetting agent and the resulting aqueous suspensions employed as sprays. In other procedures, the products may be employed as constituents of oil-in-water emulsions or water dispersions with or without the addition of wetting, dispersing or emulsifying agents. In representative operations, the application of the compound of Example 3, foregoing, O-2-(ethylthio)ethyl O-methyl sec-butylphosphoramidothioate, at the rate of 50 pounds per acre, to an area of fertile agricultural soil heavily infested with wild oats, Johnson grass, Japanese millet, and foxtail, gave a high proportion of kill, rated as a commercially successful control, of all the said grasses.

The starting alkylthio alkanols used in the synthesis of the novel phosphoramidothioates of the present invention are all synthesized readily in a manner generally set forth in the Journal of the American Chemical Society, vol. 52, page 2576 (1930). In general, the preparation is as set forth in the following reaction:

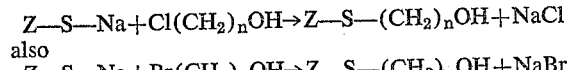

also

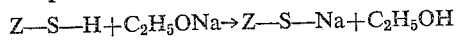

The starting alkali mercaptide may be a postassium mercaptide if desired. These mercaptides are easily prepared in known procedures, such as

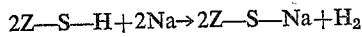

also, in a system employing liquid medium inert towards alkali metals, $$2Z-S-H + 2Na \rightarrow 2Z-S-Na + H_2$$

The synthesis goes forward readily. Good yields are obtained.

The starting phosphoramidochloridothioate compounds are synthesized by a process in which first an O-lower alkyl phosphorodichloridothioate is prepared. Such compound may be prepared by reacting a molecular excess of phosphorus thiochloride ($PSCl_3$) with an alkali metal lower alcoholate. Good results are obtained when employing from 2 to 4 moles of phosphorus thiochloride per mole of the alcoholate. The alcoholate, preferably as the sodium salt, is added with stirring to the thiochloride reagent and the mixture thereafter warmed for a short period to complete the reaction. The crude mixture may then be filtered and the filtrate fractionally distilled under reduced pressure to obtain the desired product. The O-lower alkyl phosphoramidochloridothioates employed as starting materials may be prepared by the reaction at a temperature of from —10° to 50° C. of two molecular proportions of ammonia or of a lower alkyl amine with one molecular proportion of an O-lower alkyl phosphorodichloridothioate in an organic liquid. Upon completion of the reaction, the reaction mixture may be filtered and the desired product separated from the filtrate by conventional procedures.

I claim:

1. Phosphorus compound corresponding to the formula

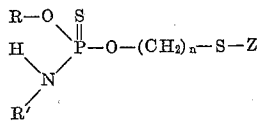

wherein R represents lower alkyl, R' is selected from R and hydrogen, $n$ represents an integer from 2 to 4, inclusive, Z represents a member of the group consisting of alkyl, and hydrocarbon aryl containing up to and including 8 carbon atoms.

2. O-(2-ethylthio)ethyl O-methyl methylphosporamidothioate.

3. O-(2 - methylthio)ethyl O - propyl methylphosphoramidothioate.

4. O-(2-ethylthio)ethyl O-methyl sec-butylphosphoramidothioate.

5. O-(2-octylthio)ethyl O-methyl ethylphosphoramidothioate.

6. O-(2-phenylthio)ethyl O-propyl methylphosphoramidothiate.

References Cited in the file of this patent

UNITED STATES PATENTS

| | | |
|---|---|---|
| 2,571,989 | Schrader | Oct. 16, 1951 |
| 2,881,201 | Schrader | Apr. 7, 1959 |
| 2,959,516 | Sallmann | Nov. 8, 1960 |
| 2,971,976 | Brust | Feb. 14, 1961 |
| 3,019,250 | Kayser et al. | Jan. 30, 1962 |

FOREIGN PATENTS

| | | |
|---|---|---|
| 789,122 | Great Britain | Jan. 15, 1958 |